(12) United States Patent
Haapanen

(10) Patent No.: US 10,742,831 B1
(45) Date of Patent: Aug. 11, 2020

(54) MANAGING ACCESS BY MOBILE DEVICES TO PRINTING DEVICES

(71) Applicant: Tom Haapanen, Kitchener (CA)

(72) Inventor: Tom Haapanen, Kitchener (CA)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/354,860

(22) Filed: Mar. 15, 2019

(51) Int. Cl.
*H04N 1/00* (2006.01)
*H04L 29/06* (2006.01)

(52) U.S. Cl.
CPC ..... *H04N 1/00856* (2013.01); *H04L 63/0876* (2013.01); *H04N 1/00244* (2013.01)

(58) Field of Classification Search
CPC .................................................. H04N 1/00856
USPC ............................................... 358/1.15, 1.14
See application file for complete search history.

(56) References Cited

U.S. PATENT DOCUMENTS

| | | | |
|---|---|---|---|
| 8,891,106 B1 | 11/2014 | Haapanen | |
| 9,203,822 B2 | 12/2015 | Ono | |
| 9,516,473 B1 | 12/2016 | Haapanen | |
| 10,423,798 B2 | 9/2019 | Claibone | |
| 2002/0140972 A1 | 10/2002 | Onishi | |
| 2006/0080525 A1 | 4/2006 | Ritter | |
| 2012/0266073 A1 | 10/2012 | Tanaka | |
| 2013/0145420 A1 | 6/2013 | Ting | |
| 2013/0227664 A1 | 8/2013 | McKay | |
| 2014/0009783 A1 | 1/2014 | Chakirov | |
| 2014/0070002 A1 | 3/2014 | Pineau | |
| 2014/0293325 A1 | 10/2014 | Haapanen | |
| 2015/0009523 A1 | 1/2015 | Jeran | |
| 2015/0092233 A1* | 4/2015 | Park ..................... G06F 3/1288 358/1.15 |
| 2015/0154484 A1 | 6/2015 | Iwasaki | |
| 2015/0161723 A1 | 6/2015 | Rose | |
| 2015/0169266 A1 | 6/2015 | Iwasaki | |
| 2015/0295898 A1 | 10/2015 | Tredoux | |
| 2016/0065781 A1* | 3/2016 | Um .................... H04N 1/00204 358/1.15 |
| 2016/0150124 A1 | 5/2016 | Panda | |
| 2016/0179449 A1 | 6/2016 | Cho | |
| 2016/0182762 A1 | 6/2016 | Eum | |
| 2016/0277597 A1 | 9/2016 | Ohara | |
| 2016/0299728 A1 | 10/2016 | Li | |
| 2016/0366240 A1 | 12/2016 | Haapanen | |
| 2017/0126671 A1 | 5/2017 | Haapanen | |
| 2017/0149873 A1 | 5/2017 | Jang | |
| 2017/0230536 A1 | 8/2017 | Haapanen | |

(Continued)

OTHER PUBLICATIONS

Haapanen, U.S. Appl. No. 16/354,872, filed Mar. 15, 2019, Office Action, dated Jan. 8, 2020.

(Continued)

*Primary Examiner* — Jacky X Zheng
(74) *Attorney, Agent, or Firm* — Hickman Palermo Becker Bingham LLP; Edward A. Becker

(57) ABSTRACT

An approach is provided for authenticating users of mobile devices for accessing printing devices. According to the approach, a short-range communications method is used to establish the identity of printing devices, and then authentication is performed using a Local Area Network (LAN)/Internet or mobile network connection. Embodiments include the use of two-phase authentication to provide additional security.

20 Claims, 5 Drawing Sheets

(56) References Cited

U.S. PATENT DOCUMENTS

| | | |
|---|---|---|
| 2017/0289364 A1 | 10/2017 | Haapanen |
| 2017/0289750 A1 | 10/2017 | Haapanen |
| 2017/0316217 A1 | 11/2017 | Smith |
| 2017/0344325 A1 | 11/2017 | Osadchyy |
| 2018/0060595 A1 | 3/2018 | Olds |
| 2018/0067705 A1 | 3/2018 | Masui |
| 2018/0095704 A1 | 4/2018 | Ueda |
| 2018/0159991 A1 | 6/2018 | Kiyose |
| 2018/0262492 A1 | 9/2018 | Daniel |
| 2019/0028610 A1 | 1/2019 | Sikkannan |
| 2019/0042774 A1 | 2/2019 | Claiborne |
| 2019/0044630 A1 | 2/2019 | Ferreira |
| 2019/0253401 A1 | 8/2019 | Asakura |
| 2019/0306160 A1 | 10/2019 | Zehler |

OTHER PUBLICATIONS

Haapanen, U.S. Appl. No. 16/354,872, filed Mar. 15, 2019, Advisory Action, dated Jun. 30, 2020.

* cited by examiner

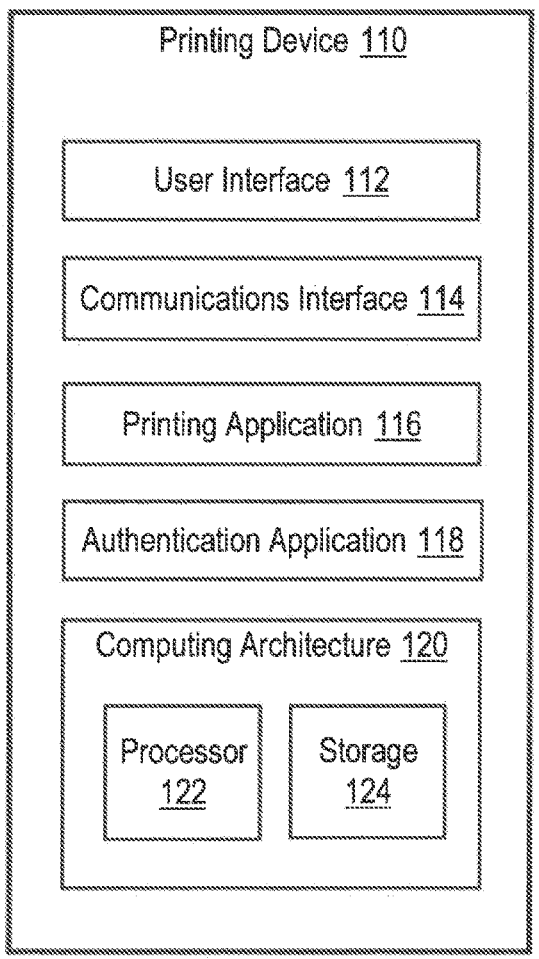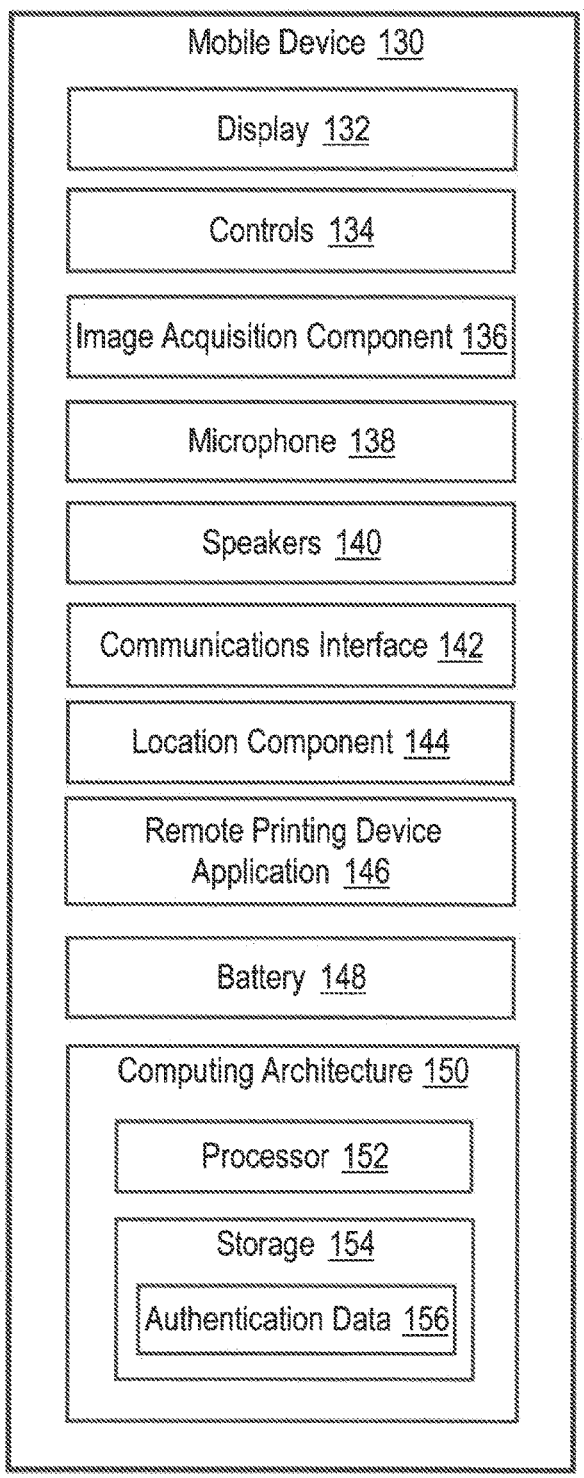

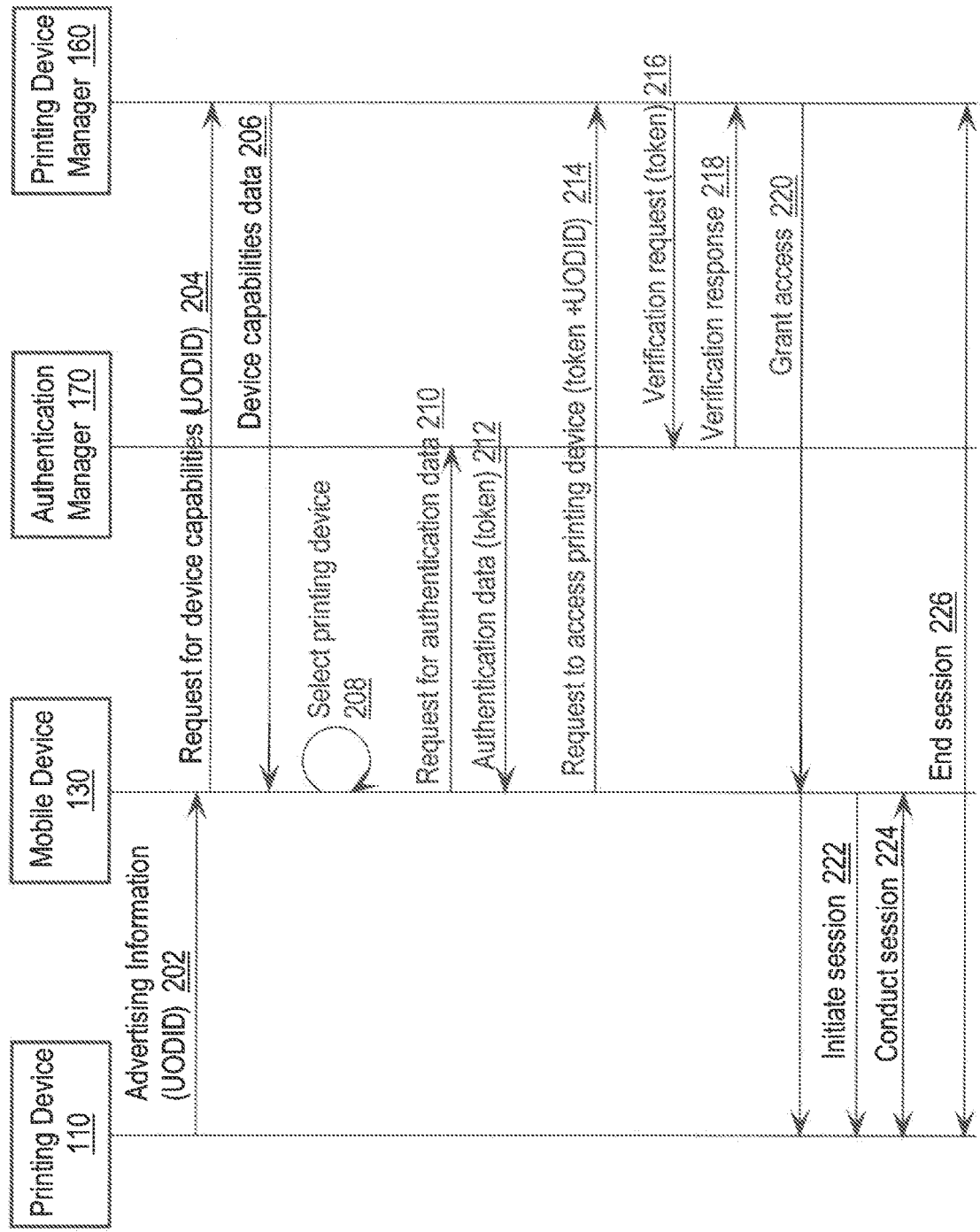

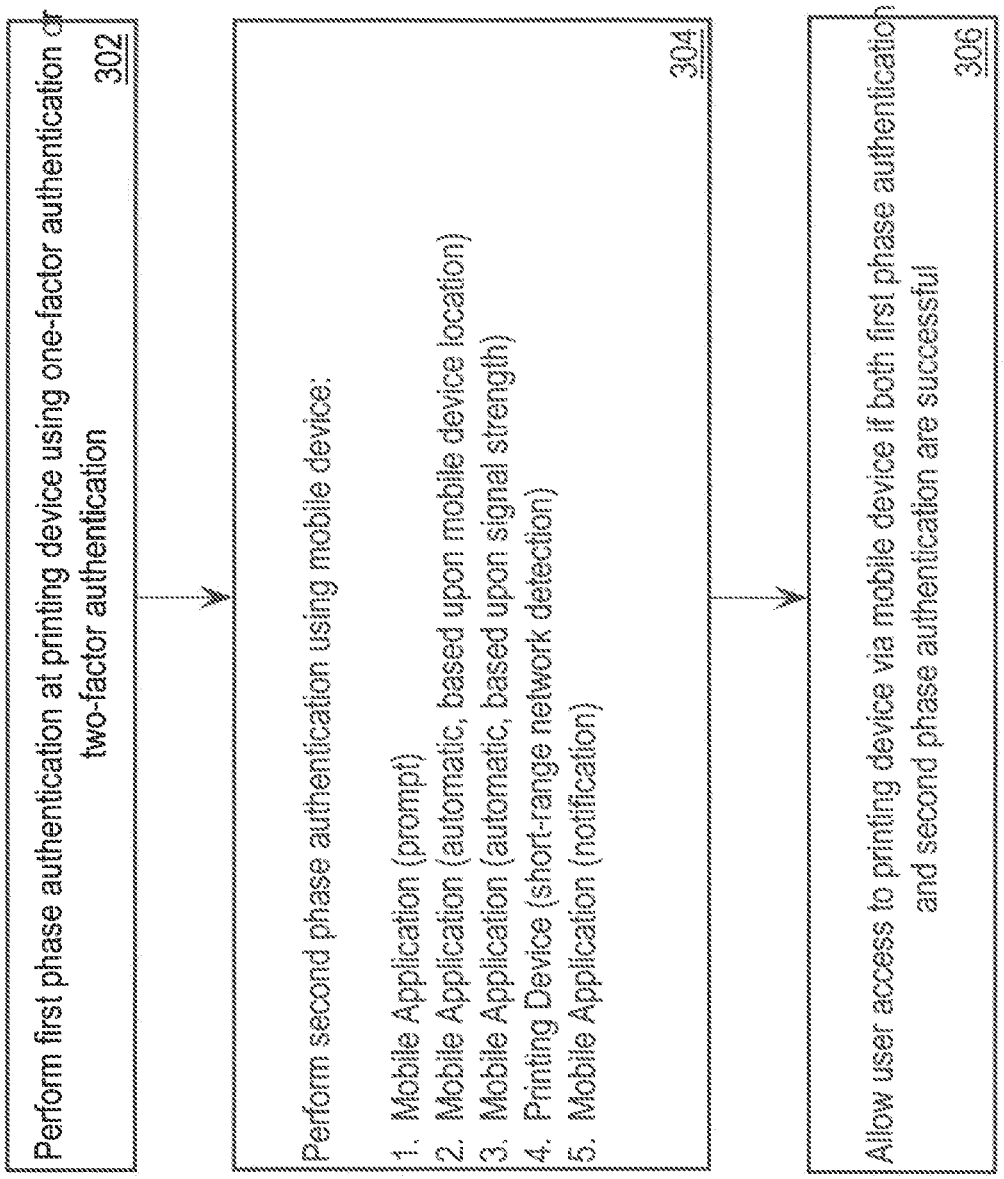

US 10,742,831 B1

MANAGING ACCESS BY MOBILE DEVICES TO PRINTING DEVICES

RELATED APPLICATION DATA

This application is related to U.S. patent application Ser. No. 16/354,872 entitled "TWO-PHASE AUTHENTICATION FOR MOBILE DEVICE ACCESS TO PRINTING DEVICES", filed Mar. 15, 2019, the contents all of which are incorporated by reference in their entirety for all purposes as if fully set forth herein

FIELD

The technical field of the present disclosure relates to improved methods, systems, computer software, and/or computer hardware in the field of managing access by mobile devices to printing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Conventional approaches for authenticating users at printing devices include manual entry of information and card-based authentication. Manually entering login credentials, such as a user identification and password or Personal Identification Number (PIN), via the operation panel of a printing device is slow and prone to error, leading to an unfavorable user experience, especially on printing devices with limited operation panels. Card-based authentication improves upon manual entry by allowing a user to identify themselves by scanning an identification card, such as a proximity card, a smart card, or a magnetic stripe card, at a card reader for a printing device. The card reader extracts the login credentials from the card, and an authentication process executing on the printing device verifies the information. Card-based authentication eliminates the need for users to manually enter information, which is faster and provides a more favorable user experience. While an improvement over manual entry, the use of identification cards does require that users carry the cards with them to be able to use printing devices that require user authentication.

With the proliferation of mobile devices and in particular smart phones, there is a need to authenticate and manage access to printing devices using mobile devices. While printing devices and mobile devices may support short-range communications methods such as Near Field Communications (NFC), Bluetooth, Bluetooth LE (BLE), and Wi-Fi, there are often limitations on the printing device side and/or the mobile device side that prevent establishing a two-way communications path between printing devices and mobile devices.

SUMMARY

A mobile device comprises a display, a communications interface, one or more processors, one or more memories, and a remote printing device application. The remote printing device application is configured to select, based upon selection criteria that include printing device capabilities, a particular available printing device from a plurality of available printing devices, obtain valid authentication data from an authentication manager, generate and transmit to a printing device manager, a request for access to the particular available printing device, wherein the request for access to the particular available printing device includes the valid authentication data from the authentication manager and printing device identification data that uniquely identifies the particular printing device, receive, from the printing device manager, a response that indicates whether access has been granted to the particular printing device, and in response to receiving, from the printing device manager, a response that indicates that access has been granted to the particular printing device, initiating a session with the particular printing device.

A method of managing access by mobile devices to printing devices includes performing, by a printing device, a first phase authentication, wherein the first phase authentication includes receiving and verifying, by the printing device, user credential data for a user of the printing device. A determination is made whether the first phase authentication was successful and in response to determining that the first phase authentication was successful, performing a second phase authentication using a mobile device of the user. A determination is made whether the second phase authentication using the mobile device of the user was successful and in response to determining that both the first phase authentication and the second phase authentication using the mobile device of the user was successful, allowing the user to access functionality provided by the printing device.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

FIG. 1B is a block diagram that depicts an example implementation of printing device and includes a user interface, a communications interface, a printing application, an authentication application, and a computing architecture that includes a processor and storage.

FIG. 1C depicts an example embodiment of a mobile device.

FIG. 2 is a message diagram that depicts an approach for managing mobile device access to printing devices, according to an embodiment.

FIG. 3 is a flow diagram that depicts two-phase authentication of mobile devices according to an embodiment.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Printing Device Architecture
   A. Printing Device
   B. Mobile Device
   C. Mail Item Manager
   D. Authentication Manager
III. Mobile Device Authentication
   A. Overview
   B. Authenticating Users of Mobile Devices for Accessing Printing Devices
IV. Two-Phase Authentication
   A. First Phase Authentication
   B. Second Phase Authentication
      1. Mobile Application (prompt)
      2. Mobile Application (automatic, based upon mobile device location)
      3. Mobile Application (automatic, based upon signal strength)
      4. Printing Device (short-range network detection)
      5. Mobile Application (notification)
V. Implementation Examples

I. Overview

An approach is provided for authenticating users of mobile devices for accessing printing devices. According to the approach, a short-range communications method is used to establish the identity of printing devices, and then authentication is performed using a Local Area Network (LAN)/Internet or mobile network connection. Embodiments include the use of two-phase authentication to provide additional security. This approach leverages the ubiquity and user-friendliness of mobile devices.

II. Printing Device Architecture

Figure 1A:
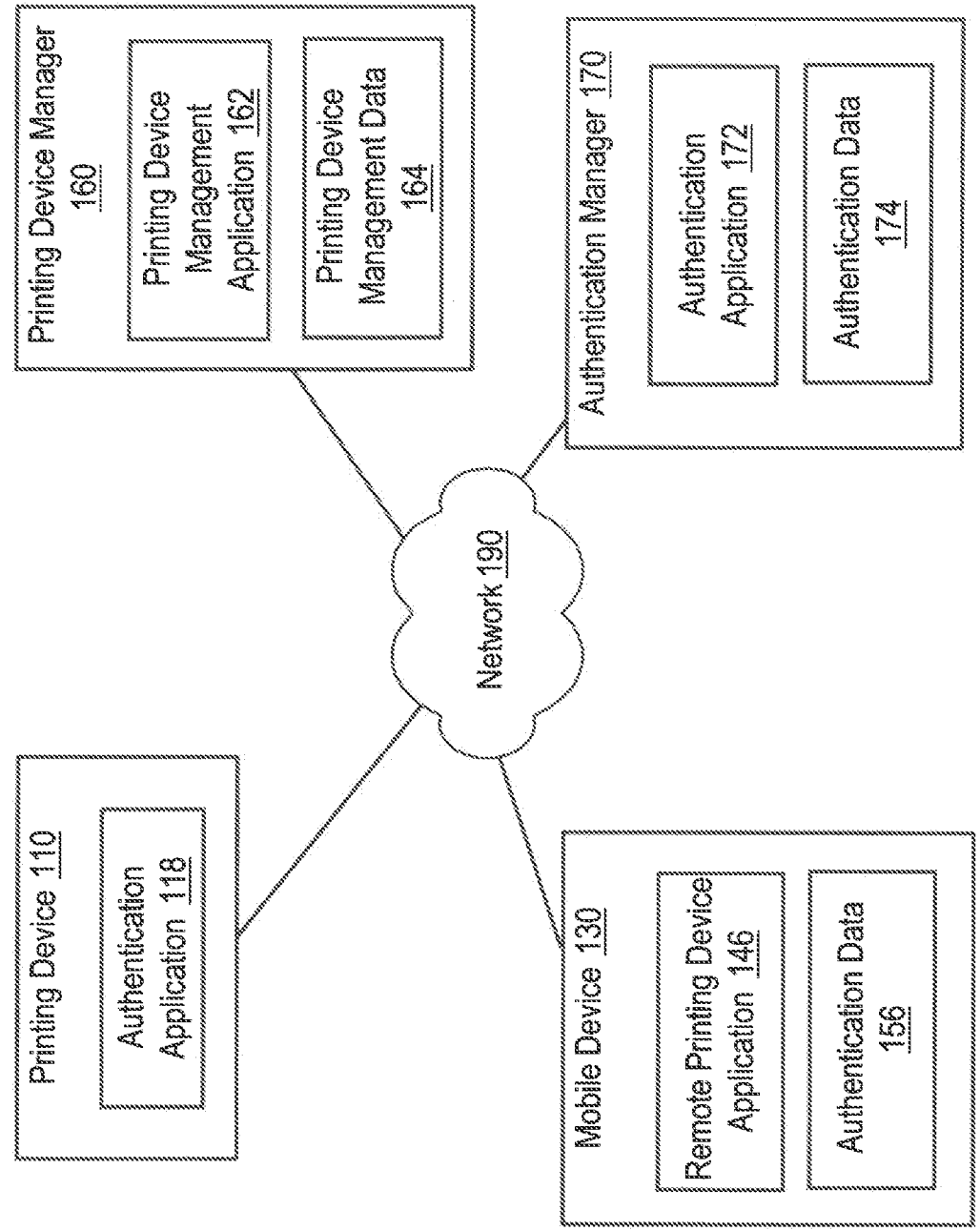
FIG. 1A is a block diagram that depicts a printing device arrangement.

FIG. 1A is a block diagram that depicts a printing device arrangement 100. Arrangement 100 includes printing device 110, a mobile device 130, a printing device manager 160, and authentication manager 170, communicatively coupled via a network 190. Network 190 may be implemented by one or more wireless and/or wired computer networks of any type. In addition, the elements depicted in FIG. 1A may have direct communications links.

A. Printing Device

Printing device 110 is any type of device that is capable of generating a printed version of electronic information, is not limited to a printer per se, and may include other functionality. Examples of printing device 110 include, without limitation, printers, copiers, facsimile machines, transcription devices, Mult-Function Peripherals (MFPs), portable printing devices, etc.

FIG. 1B is a block diagram that depicts an example implementation of printing device 110 and includes a user interface 112, a communications interface 114, a printing application 116, an authentication application 118, and a computing architecture 120 that includes a processor 122 and storage 124. Printing device 110 may include additional elements or fewer elements depending upon a particular implementation. Elements pertaining to generating printed versions of electronic documents are not shown for purposes of brevity. Although embodiments are depicted in the figures and described herein in the context of a single printing device 110, this is done for explanation purposes only and embodiments are applicable to any number of printing devices.

User interface 112 displays information to and/or receives user input from users of printing device 110. User interface 112 may be implemented, for example, by a display and physical controls, such as a keyboard/keypad, a display and "soft" controls, such as graphical user interface controls, a touchscreen display, etc.

Communications interface 114 allows printing device 110 to communicate with other devices via network 190 and/or directly, and may be implemented by one or more wireless and/or wired computer communications interfaces to support communications via Bluetooth, BLE, WiFi, WiGig, Near Field Communication (NFC), Infrared Data Association (IrDA), wireless USB, ZigBee, other Wireless Personal Area Network (WPAN) methodologies, etc.

Printing application 116 manages printing operations on printing device 110 including, for example, causing printed versions of electronic documents to be generated. Printing application 116 may be accessed, for example, by print drivers on client devices, etc.

Authentication application 118 manages the authentication of mobile devices via printing device manager 160, as described in more detail hereinafter. Computing architecture 120 includes a processor 122 and storage 124, and supports the execution of computing processes and the storage of data, such as print jobs, on printing device 110. Processor 122 may be one or more computer processors that are capable of executing instructions stored in storage 124. Storage 124 may be implemented by volatile storage, non-volatile storage, or any combination of volatile and non-volatile storage.

B. Mobile Device

Mobile device 130 is a mobile device that allows a user to access functionality of printing device 110. FIG. 1C depicts an example embodiment of mobile device 130 and includes a display 132, controls 134, an image acquisition component 136, a microphone 138, speakers 140, a communications interface 142, a location component 144, a remote printing device application 146, a battery 148, and a computing architecture 150. Embodiments of mobile device 130 are not limited to the example depicted in FIG. 1C and mobile device 130 may have fewer elements or additional elements, depending upon a particular implementation.

Display 132 allows mobile device 130 to display information to a user and may be implemented by one or more displays or screens, etc. Display 132 is configured to display text and/or images in black and white and/or color. Display 132 may also be configured to accept user input via a touch screen.

Controls 134 allow a user to provide user input to mobile device 130 and may include, for example, physical controls such as buttons, sliders, etc., and soft controls, such as graphical user interface objects, displayed on display 132. Embodiments may also include remote controls. For example, a physical controller, external touchscreen, or other device may include physical or soft controls that allow a user to provide input to mobile device 130. These devices may communicate with mobile device 130 via a wired or wireless connection.

Image acquisition component 136 acquires images and generates image data that represents the images. Image acquisition component 136 may include, for example, one or more cameras and associated computer hardware and/or computer software or firmware.

Microphone 138 receives audio input from a user and converts the audio input into electronic signals. According to an embodiment, mobile device 130 support voice recognition and recognizes spoken commands for controlling mobile device 130. Speakers 140 converts audio signals into audio output for users.

Communications interface 142 allows mobile device 130 to communicate with other devices and may be implemented by one or more wireless and/or wired computer communications interfaces to support communications via Bluetooth, BLE, WiFi, WiGig, Near Field Communication (NFC), Infrared Data Association (IrDA), wireless USB, ZigBee, other Wireless Personal Area Network (WPAN) methodologies, mobile device wireless networks, etc.

A location component 144 is an element that determines a current location of mobile device 130. The current location may be determined based upon data from sensors, such as GPS sensors, proximity sensors, etc.

Remote printing device application 146 allows a user to invoke functionality on printing devices, such as printing device 110. Remote printing device application 146 may provide a graphical user interface that includes various controls for invoking functionality on printing device 110. The graphical user interface may mimic information displayed on user interface 112 of printing device 110 to provide a more favorable user experience.

Battery 148 provides electrical power to mobile device 130 and may include any number of batteries of any type. Computing architecture 150 includes a processor 152 and storage 154 and supports the execution of computing processes and the storage of data on mobile device 130. Processor 152 may be one or more computer processors that are capable of executing instructions stored in storage 154. Storage 154 may be implemented by volatile storage, non-volatile storage, or any combination of volatile and non-volatile storage.

C. Printing Device Manager

Printing device manager 160 manages printing devices, including managing access to printing devices via mobile devices. Printing device manager 160 includes a printing device management application 162 that manages printing device and access to printing devices via mobile devices. Printing device manager 160 also maintains and manages printing device management data 164. Printing device manager 160 may include other elements that may vary depending upon a particular implementation. For example, Printing device manager 160 may include one or more processors, one or more memories, one or more communications interfaces, etc., that are not depicted in FIG. 1A for purposes of explanation. Printing device management application 162 may be implemented by one or more processes for managing printing devices and access to printing devices as described in more detail hereinafter. Printing device management application 162 may support an API that provides access to functionality of printing device management application 162. For example, the API may support commands pertaining to authentication that may be used by printing devices to verify that mobile devices have been properly authenticated. The API may also support commands for mobile devices to request access to printing devices. The API may also provide access to information stored and managed by printing device management application 162.

D. Authentication Manager

Authentication manager 170 is an entity with an authentication application 172 that manages authentication data 174. Embodiments are applicable to any type of authentication data including, for example, authentication tokens. Authentication manager 170 may support an API that is used by entities, such as mobile device 130 and printing device manager 160 to obtain information from authentication manager 170. For example, the API may support commands that allow an entity to request or verify an authentication token. Authentication manager 170 may be implemented by one or more processes executing on one or more computing devices.

III. Mobile Device Authentication

A. Overview

According to an embodiment, users of mobile devices are authenticated for accessing printing devices. A short-range communications method is used to establish the identity of printing devices, and then authentication is performed using a Local Area Network (LAN)/Internet or mobile network connection.

B. Authenticating Users of Mobile Devices for Accessing Printing Devices

FIG. 2 is a message diagram 200 that depicts an approach for managing mobile device access to printing devices, according to an embodiment. In this example, it is presumed that a user of mobile device 130 wishes to access a printing device, for example, to print an electronic document. The user may initiate the process by selecting a graphical user interface control displayed by remote printing device application 146. Upon selecting the control, mobile device 130 begins listening for transmissions made by candidate printing devices via a short-range communications method, such as Bluetooth, BLE, WiFi, WiGig, NFC, IrDA, wireless USB, ZigBee, other WPAN methodologies, etc.

In step 202, printing device 110 transmits advertising information using a short-range communications method. Printing device 110 may transmit advertising information periodically and/or in response to certain events, such as startup, etc., and may be done concurrently with other nearby printing devices. According to an embodiment, the advertising information includes printing device identification data that uniquely identifies printing device 110. Printing device identification data may be based, for example, upon the Media Access Control (MAC) address or Internet Protocol (IP) address of a printing device. One example of printing device identification data that uniquely identifies printing device 110 is a Unique Output Device ID (UODID).

Advertising information may include other information about a printing device, such as one or more capabilities of a printing device. For example, advertising information may specify a basic set of features or functionality supported by a printing device. As another example, advertising information may specify a full set of features or functionality supported by a printing device. Features and functionality of a printing device may include, for example, basic settings, layout settings, finishing settings, cover mode settings, stamp/composition settings, quality settings, and other settings. Features and functionality of a printing device may also include a location of a printing device, and network address information, although the network address information may also not be included in the advertising information for security purposes. Alternatively or in addition to, and as described in more detail hereinafter, printing device capability data may be stored and maintained by printing device manager 160.

Mobile device 130 detects the transmission by printing device 110, receives the advertising information and in step 204, requests the capabilities of printing device 110 from printing device manager 160, assuming that the advertising information does not include the capabilities of printing device 110. This may include mobile device 130 extracting the UODID of printing device 110 and generating and transmitting to printing device manager 160, a request for device capabilities of printing device 110, where the request includes the UODID of printing device 110. The request may conform to an Application Program Interface (API) supported by printing device management application 162 and may include, for example, a command that corresponds to a request for printing device capability data. Step 204 is optional and may not be performed, for example, when the advertising information transmitted by printing device 110 includes the capabilities of printing device 110.

In step 206, printing device manager 160 generates and transmits a response to mobile device 130, where the response includes data that either indicates that the UODID of the printing device was not found, or specifies the capabilities of printing device 110. Printing device management data 164 may include a table of printing device capability data for any number of printing devices, where each row in the table corresponds to a particular UODID and includes printing device capability data for a corresponding printing device. Printing device management application 162 locates a particular row of the table that has the same UODID value contained in the request from mobile device 130 and includes printing device capability data from the row in the response. If no entry in the table with the same UODID included in the request is found, the printing device is not currently managed by printing device manager 160.

Steps 202-206 may be repeated for any number of candidate printing devices. For example, mobile device 130 may be in the vicinity of several candidate printing devices and the process of steps 202-206 is repeated for each of the printing devices.

In step 208, mobile device 130 selects a particular printing device from among the candidate printing devices. According to an embodiment, the selection is made based upon selection criteria that include, for example, printing device capabilities, location, and user preferences. To be selected, a printing device may need to support certain printing device capabilities required by mobile device 130, which may be specific to a particular electronic document to be printed. For example, color printing and/or particular finishing options may be required to print a particular electronic document. Candidate printing devices that do not have the capabilities required to print a particular electronic document may be eliminated from further consideration.

Location may be the closest location among candidate printing devices, or may be a threshold, e.g., within a specified distance of mobile device 130. Location may be specified by the device capabilities data for a printing device, or may be determined by other methods, such as signal strength. User preferences may be represented by user preference data stored on mobile device 130 and may specify particular preferences of the user of mobile device 130. An example of a user preference is a specified type or class of printing device that is familiar to the user. Selection criteria may be weighted based upon importance and a cost function may be used to select a "best" printing device for a particular situation. For example, given a set of required printing device capabilities, location may be weighted more heavily than user preferences. For another mobile device, however, user preferences may be weighted more heavily than location, so a candidate mobile device that is further away, but that better satisfies the user preferences, may be selected over a printing device that is closer, but that does not satisfy the user preferences as well.

In step 210, mobile device 130 generates and transmits a request for authentication data to authentication manager 170. The request complies with the API supported by authentication manager 170 and may include a command to request authentication data. For example, the request may be a request for an authentication token. The request may also include user credentials, such as a user ID and password. Embodiments are applicable to any type of authentication data, and authentication data may expire, for example, after expiration of a specified amount of time, the occurrence of an event, etc.

Authentication application 172 processes the request, which may include validating the user credentials contained in the request using information maintained by authentication manager 170, or via an external service, such as an Authentication, Authorization, and Accounting (AAA) service. Authentication application 172 then generates the authentication data for mobile device 130 and stores the authentication data in authentication data 174. For purposes of explanation, embodiments are described herein in the context of authentication tokens, but embodiments are not limited to authentication tokens, and are applicable to any type of authentication data.

In situations where mobile device 130 has previously obtained an authentication token that is still valid, mobile device 130 may itself authenticate the user using, for example, biometric information such as a finger print or face ID, and then provide the authentication token to authentication application 172 for validation. If the authentication token is no longer valid, mobile device 130 may prompt the user to enter their user credentials and perform steps 210 and 212 as previously described.

In step 214, mobile device generates and transmits an access request to printing device manager 160 to request access to printing device 110. The request complies with the API supported by printing device manager 160 and includes the valid authentication token of mobile device 130 and the UODID of printing device 110.

In step 216, printing device manager 160 generates and transmits to authentication manager 170 a request to validate the authentication token provided by mobile device 130. Authentication manager 170 validates the authentication token, either locally or via a remote service, and in step 218 generates and transmits to printing device manager 160 a verification response indicating whether the authentication token is valid.

Assuming that the response from authentication manager 170 in step 218 indicates that the authentication token is still valid, then in step 220, printing device manager 160 grants access to printing device 110 by mobile device 130. This may include sending information, such as a device ID of mobile device 130 or authentication data, such as a local authentication token, to printing device 110 and mobile device 130 that specifies that access has been granted to mobile device 130. According to an embodiment, printing device manager 160 provides network address information for printing device 110, such as an IP address, port number, etc., to allow mobile device 130 to conduct an interactive session with printing device 110 using a network, such as a LAN or mobile network connection.

In step 222, mobile device 130 initiates a session with printing device 110 by generating and transmitting a request to printing device 110. The request includes the device ID of mobile device 130 or the authentication data received from printing device manager 160. The request may be transmitted using the network address information for printing device 110 provided by printing device manager 160. Printing device 110 verifies the information and a session is conducted in step 224, which may include a user invoking functionality of printing device 110 directly via printing device 110 or using mobile device 130. The verification may include verifying a local authentication token provided by mobile device 130 using printing device manager 160.

Sometime later in step 226 the session with printing device 110 ends, for example, in response to a user selecting one or more graphical user interface objects displayed by remote printing device application 146 on mobile device 130. The session may also be terminated after expiration of a maximum session length, an idle timeout, or loss of short-range connectivity between printing device 110 and mobile device 130. In response to the session ending, mobile device 130 may send a notification to printing device 110 and/or printing device manager 160.

As an alternative to mobile device 130 requesting access to printing device 110 from printing device manager 160 and printing device manager 160 verifying the authentication token in steps 214-218, mobile device 130 may request access directly from printing device 110. In this situation, mobile device 130 provides the authentication token to printing device 110 and printing device 110 verifies the authentication token. Printing device 110 may verify the authentication token via authentication manager 170, in the same manner as printing device manager 160 in steps 216, 218, or directly via printing device manager 160.

IV. Two-Phase Authentication

There may be situations where additional security is desirable, for example, in environments that include sensitive or confidential information. According to an embodiment, additional security is provided by two-phase authentication, where the first phase leverages security provided via a printing device, and the second phase leverages additional security provided by a mobile device.

A. First Phase Authentication

First phase authentication is performed at printing device and may include one-factor authentication, or two-factor authentication for additional security. One-factor authentication may include mobile device 130 querying a user to provide login credentials, such as a user ID and password. The login credentials may be manually entered via an operation panel of mobile device 130, or via a proximity card, a smart card, an NFC card, etc. For example, user interface 112 of printing device 110 may display a message asking a user to enter their login ID and password, or scan an identification card.

Two-factor authentication provides additional security relative to one-factor authentication by requiring additional information from a user that is not available via a card or mobile device 130. Requiring both information from a card and information manually provided by a user increases security by denying access to third parties that acquire the card or mobile device 130. For example, after a user has scanned a card, user interface 112 of printing device 110 queries the user for additional information not available on the card or mobile device 130. The additional information may include a PIN, password, a user ID and a password, etc. Thus, for example, two-factor authentication uses a) a card+PIN; b) a card+password; or c) a card+user ID+password, etc. Printing device 110 verifies the login credentials and second factor information, either locally, or using an external service, such as authentication manager 170.

B. Second Phase Authentication

Once the first phase authentication has been completed, a second phase authentication may be performed that further enhances security. Second phase authentication may always be performed in conjunction with first phase authentication, or may be selectively performed. For example, second phase authentication may be performed in accordance with a policy, with particular users or groups of users, with particular printing devices, etc. Thus, a particular business enterprise or organization may selectively use second phase authentication for users and printing devices that handle sensitive or confidential documents. Second phase authentication may include five different types of second phase authentication described in more detail below. Although described separately, the second phase authentication methods described hereinafter may be performed in combination.

1. Mobile Application (Prompt)

This method involves an authentication server or a printing device manager contacting an application on the mobile device to verify a login with the user of the mobile device. For example, suppose that the approach above for authenticating a user of mobile device 130 to access printing device 110 has been completed and in addition, the first phase authentication has been completed. In accordance with a particular policy, group of users, etc., a determination is made that a second phase authentication is required for printing device 110.

To implement the second phase authentication according to this method, authentication manager 170 or printing device manager 160 requests, for example via network 190 or a wireless network connection, that remote printing device application 146 obtain manual confirmation from the user of mobile device 130. In response to the request, remote printing device application 146 requests that the user manually verify the login, for example, by selecting one or more graphical user interface objects displayed on display 132 of mobile device 130. After the login has been confirmed via remote printing device application 146, remote printing device application 146 generates and transmits a confirmation to authentication manager 170 or printing device manager 160. authentication manager 170 or printing device manager 160 then grants mobile device 130 access to printing device 110. This may be performed, for example, as part of step 220 of FIG. 2 and be an additional condition of granting the user access to printing device 110.

2. Mobile Application (Automatic, Based Upon Mobile Device Location)

This method involves an authentication server or printing device manager contacting an application on the mobile device to verify that the mobile device is physically near the printing device. As with the first method above, the approach above for authenticating a user of mobile device 130 to access printing device 110 has been completed and in addition, the first phase authentication has been completed. In accordance with a particular policy, group of users, etc., a determination is made that a second phase authentication is required for printing device 110.

To implement the second phase authentication according to the second method, authentication manager 170 or printing device manager 160 requests that mobile device 130 verify that it is physically located near to printing device 110. This may include authentication manager 170 or printing device manager 160 device providing data that specifies the identity and/or location of printing device 110. Remote printing device application 146 determines whether mobile device 130 is within a specified distance of printing device 110, where the specified distance is stored in mobile device 130 and/or specified by authentication manager 170 or printing device manager 160. Remote printing device application 146 provides a response to authentication manager 170 or printing device manager 160, and if mobile device 130 is within a specified distance of printing device 110, then authentication manager 170 or printing device manager 160 allows mobile device 130 to access printing device 110. This may be performed, for example, as part of step 220 of FIG. 2 and be an additional condition of granting the user access to printing device 110.

3. Mobile Application (Automatic, Based Upon Signal Strength)

This method involves an authentication server or printing device manager contacting an application on the mobile device to verify the signal strength of the printing device at the mobile device. As with the first method above, the approach above for authenticating a user of mobile device 130 to access printing device 110 has been completed and in addition, the first phase authentication has been completed. In accordance with a particular policy, group of users, etc., a determination is made that a second phase authentication is required for printing device 110.

To implement the second phase authentication according to the third method, authentication manager 170 or printing device manager 160 requests that mobile device 130 verify the signal strength of printing device 110. This may include authentication manager 170 or printing device manager 160 device providing data that specifies the identity of printing device 110 and a signal strength threshold. Remote printing device application 146 determines the signal strength of communications from printing device 110. For example, remote printing device application 146 may measure the signal strength of short-range communications, e.g., NFC, Bluetooth, BLE, etc., transmitted by printing device. If the measure signal strength is above a specified threshold, then this indicates that printing device 110 is within close proximity to mobile device 130. Remote printing device application 146 provides a response to authentication manager 170 or printing device manager 160 and if the measured signal strength is above the specified threshold, then authentication manager 170 or printing device manager 160 allows mobile device 130 to access printing device 110. This may be performed, for example, as part of step 220 of FIG. 2 and be an additional condition of granting the user access to printing device 110. According to an embodiment, the methods pertaining to location and signal strength may be combined, e.g., access to printing device 110 is conditioned upon both mobile device 130 being within a specified distance of printing device 110 and the signal strength being above the specified threshold.

4. Printing Device (Short-Range Network Detection)

This method involves an authentication server or printing device manager contacting the printing device to verify that a specified mobile device can be detected by the printing device, for example, using a short-range communications method. As with the first method above, the approach above for authenticating a user of mobile device 130 to access printing device 110 has been completed and in addition, the first phase authentication has been completed. In accordance with a particular policy, group of users, etc., a determination is made that a second phase authentication is required for printing device 110.

To implement the second phase authentication according to the fourth method, authentication manager 170 or printing device manager 160 requests that printing device 110 verify the nearby presence of mobile device 130. This may include authentication manager 170 or printing device manager 160 device providing data that specifies the identity of mobile device 130. Printing device 110 uses a discovery mechanism, for example, using Bluetooth, BLE, WiFi, WiGig, NFC, IrDA, wireless USB, ZigBee, other WPAN methodologies, etc., to discover nearby devices. Printing device 110 then determines whether mobile device 130 is one of the discovered nearby devices. Printing device 110 provides a response to authentication manager 170 or printing device manager 160 confirming whether mobile device 130 was discoverable by printing device 110 and if so, then authentication manager 170 or printing device manager 160 allows mobile device 130 to access printing device 110. This may be performed, for example, as part of step 220 of FIG. 2 and be an additional condition of granting the user access to printing device 110.

5. Mobile Application (Notification)

This method involves an authentication server or printing device manager contacting the user of the mobile device via a message and requiring a response. As with the first method above, the approach above for authenticating a user of mobile device 130 to access printing device 110 has been completed and in addition, the first phase authentication has been completed. In accordance with a particular policy, group of users, etc., a determination is made that a second phase authentication is required for printing device 110.

To implement the second phase authentication according to the fifth method, authentication manager 170 or printing device manager 160 generates and transmits a message to remote printing device application 146. The message may be any type of message, such as a text message, email, or other type of message. The message requests a response from the user of mobile device 130. If the user responds within a specified amount of time, then authentication manager 170 or printing device manager 160 allows mobile device 130 to access printing device 110. This may be performed, for example, as part of step 220 of FIG. 2 and be an additional condition of granting the user access to printing device 110.

FIG. 3 is a flow diagram 300 that depicts two-phase authentication of mobile devices according to an embodiment. In step 302, first phase authentication is performed at the printing device using one-factor authentication or two-factor authentication. As previously described herein, one-factor authentication may include mobile device 130 querying a user to provide login credentials, such as a user ID and password, and printing device 110 verifies the supplied login credentials, for example, either locally or using an external service, such as authentication manager 170. Two-factor authentication provides additional security relative to one-factor authentication by requiring additional information from a user that is not available via a card or mobile device 130. Printing device 110 verifies the additional information, either locally or using an external service, such as authentication manager 170. Requiring both information from a card and information manually provided by a user increases security by denying access to third parties that acquire the card or mobile device 130.

In step 304, a second authentication is performed using the user's mobile device. This may include any of the five methods previously described herein, or any combination thereof.

In step 306, if both the first phase authentication and the second phase authentication are successful, then the user is granted access to printing device 110.

V. Implementation Examples

According to one embodiment, the techniques described herein are implemented by at least one computing device.

The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
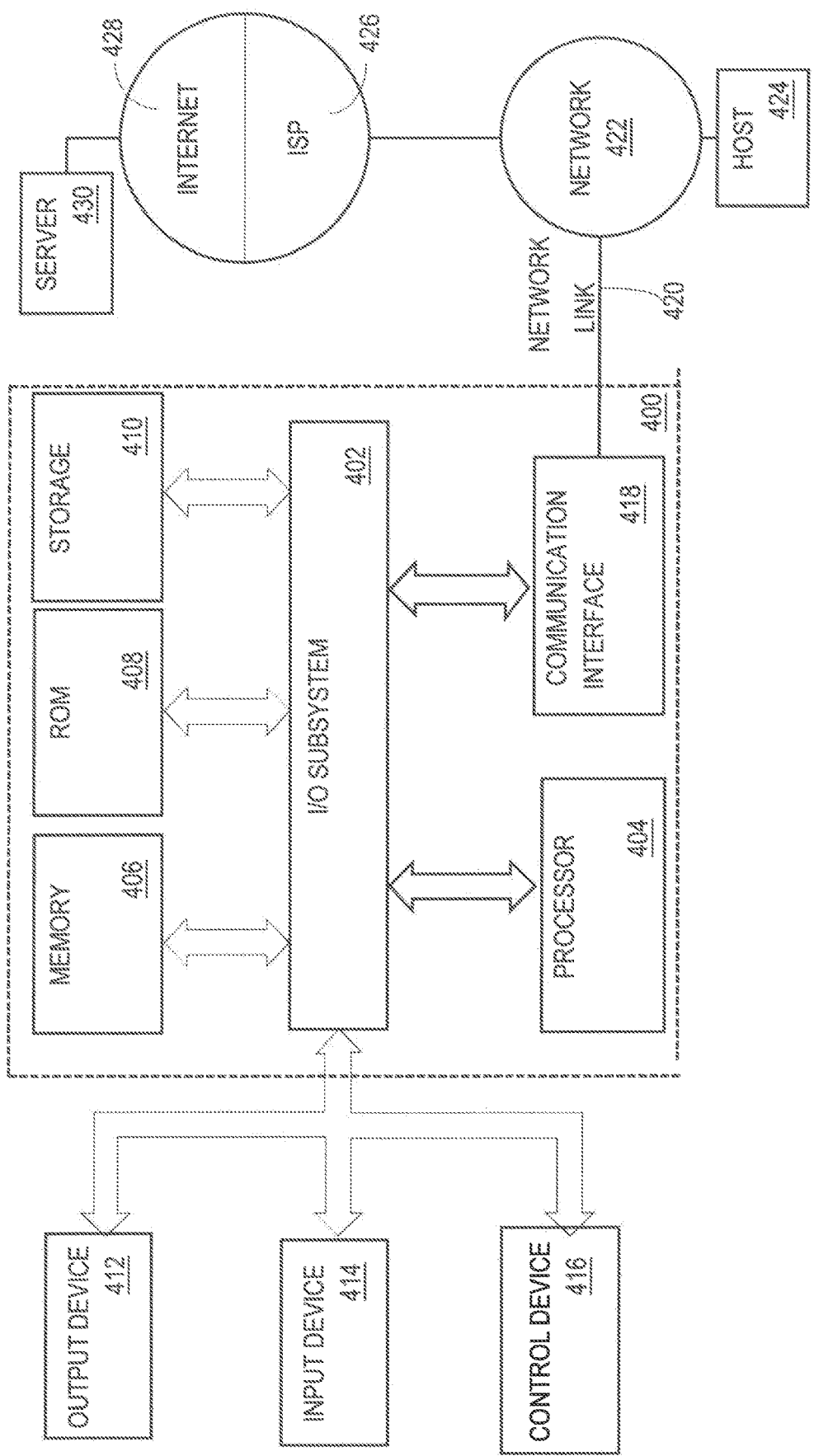
FIG. 4 is a block diagram that depicts an example computer system upon which embodiments may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or Bluetooth technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The invention claimed is:

1. A mobile device comprising:
a display;
a communications interface;
one or more processors;
one or more memories; and
a remote printing device application configured to:
  select, based upon selection criteria that include printing device capabilities, a particular available printing device from a plurality of available printing devices,
  obtain valid authentication data from an authentication manager,
  generate and transmit to a printing device manager, a request for access to the particular available printing device, wherein the request for access to the particular available printing device includes the valid authentication data from the authentication manager and printing device identification data that uniquely identifies the particular printing device,
  receive, from the printing device manager, a response that indicates whether access has been granted to the particular printing device,
  in response to receiving, from the printing device manager, a response that indicates that access has been granted to the particular printing device, initiating a session with the particular printing device.

2. The mobile device as recited in claim 1, wherein the selection criteria includes one or more of location or user preferences.

3. The mobile device as recited in claim 1, wherein the valid authentication data is a valid authentication token.

4. The mobile device as recited in claim 1, wherein:
the response that indicates whether access has been granted to the particular printing device includes a local authentication token issued by the printing device manager, and
initiating a session with the particular printing device includes providing the local authentication token to the particular printing device.

5. The mobile device as recited in claim 1, wherein initiating a session with the particular printing device includes allowing a user of the mobile device to perform one or more functions on the particular printing device using the remote printing device application.

6. The mobile device as recited in claim 1, wherein the remote printing device application is further configured to:
receive, from the particular printing device via a short-range communications link, the printing device identification data that uniquely identifies the particular printing device and printing device capabilities data that specifies one or more capabilities of the particular printing device, and
the selection of the particular available printing device from the plurality of available printing devices is made based upon both the printing device capabilities data that specifies one or more capabilities of the particular printing device and the selection criteria that include printing device capabilities.

7. The mobile device as recited in claim 6, wherein the short-range communications link includes a near field communications link or a Bluetooth link.

8. A one or more non-transitory computer-readable media storing instructions which, when processed by one or more processors, cause:
a remote printing device application to:
select, based upon selection criteria that include printing device capabilities, a particular available printing device from a plurality of available printing devices,
obtain valid authentication data from an authentication manager,
generate and transmit to a printing device manager, a request for access to the particular available printing device, wherein the request for access to the particular available printing device includes the valid authentication data from the authentication manager and printing device identification data that uniquely identifies the particular printing device,
receive, from the printing device manager, a response that indicates whether access has been granted to the particular printing device,
in response to receiving, from the printing device manager, a response that indicates that access has been granted to the particular printing device, initiating a session with the particular printing device.

9. The one or more non-transitory computer-readable media as recited in claim 8, wherein the selection criteria includes one or more of location or user preferences.

10. The one or more non-transitory computer-readable media as recited in claim 8, wherein the valid authentication data is a valid authentication token.

11. The one or more non-transitory computer-readable media as recited in claim 8, wherein:
the response that indicates whether access has been granted to the particular printing device includes a local authentication token issued by the printing device manager, and
initiating a session with the particular printing device includes providing the local authentication token to the particular printing device.

12. The one or more non-transitory computer-readable media as recited in claim 8, wherein initiating a session with the particular printing device includes allowing a user of the mobile device to perform one or more functions on the particular printing device using the remote printing device application.

13. The one or more non-transitory computer-readable media as recited in claim 8, further comprising additional instructions which, when processed by the one or more processors, cause the remote printing device application to:
receive, from the particular printing device via a short-range communications link, the printing device identification data that uniquely identifies the particular printing device and printing device capabilities data that specifies one or more capabilities of the particular printing device, and
the selection of the particular available printing device from the plurality of available printing devices is made based upon both the printing device capabilities data that specifies one or more capabilities of the particular printing device and the selection criteria that include printing device capabilities.

14. The one or more non-transitory computer-readable media as recited in claim 13, wherein the short-range communications link includes a near field communications link or a Bluetooth link.

15. A computer-implemented method comprising:
a remote printing device application:
selecting, based upon selection criteria that include printing device capabilities, a particular available printing device from a plurality of available printing devices,
obtaining valid authentication data from an authentication manager,
generating and transmitting to a printing device manager, a request for access to the particular available printing device, wherein the request for access to the particular available printing device includes the valid authentication data from the authentication manager and printing device identification data that uniquely identifies the particular printing device,
receiving, from the printing device manager, a response that indicates whether access has been granted to the particular printing device,
in response to receiving, from the printing device manager, a response that indicates that access has been granted to the particular printing device, initiating a session with the particular printing device.

16. The computer-implemented method as recited in claim 15, wherein the selection criteria includes one or more of location or user preferences.

17. The computer-implemented method as recited in claim 15, wherein the valid authentication data is a valid authentication token.

18. The computer-implemented method as recited in claim 15, wherein:
the response that indicates whether access has been granted to the particular printing device includes a local authentication token issued by the printing device manager, and
initiating a session with the particular printing device includes providing the local authentication token to the particular printing device.

19. The computer-implemented method as recited in claim 15, wherein initiating a session with the particular printing device includes allowing a user of the mobile device to perform one or more functions on the particular printing device using the remote printing device application.

20. The computer-implemented method as recited in claim 15, further comprising the remote printing device application:
receiving, from the particular printing device via a short-range communications link, the printing device identification data that uniquely identifies the particular printing device and printing device capabilities data that specifies one or more capabilities of the particular printing device, and
the selection of the particular available printing device from the plurality of available printing devices is made based upon both the printing device capabilities data that specifies one or more capabilities of the particular printing device and the selection criteria that include printing device capabilities.

* * * * *